US010003500B2

(12) United States Patent
Soni et al.

(10) Patent No.: US 10,003,500 B2
(45) Date of Patent: *Jun. 19, 2018

(54) SYSTEMS AND METHODS FOR RESOURCE SHARING BETWEEN TWO RESOURCE ALLOCATION SYSTEMS

(71) Applicant: eBay Inc., San Jose, CA (US)

(72) Inventors: Mohit Soni, San Jose, CA (US); Rami El-Charif, San Jose, CA (US); Meghdoot Bhattacharya, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/474,039

(22) Filed: Mar. 30, 2017

(65) Prior Publication Data

US 2017/0207977 A1    Jul. 20, 2017

Related U.S. Application Data

(63) Continuation of application No. 14/581,912, filed on Dec. 23, 2014, now Pat. No. 9,686,141.

(51) Int. Cl.
*G06F 9/455* (2018.01)
*H04L 12/24* (2006.01)
(Continued)

(52) U.S. Cl.
CPC ...... *H04L 41/0896* (2013.01); *G06F 9/45558* (2013.01); *G06F 9/5066* (2013.01);
(Continued)

(58) Field of Classification Search
CPC ...... G06F 9/45558; G06F 9/5066; H04Q 3/66
See application file for complete search history.

(56) References Cited

U.S. PATENT DOCUMENTS 9,686,141 B2     6/2017   Soni et al.
2001/0033646 A1*  10/2001  Porter ..................... H04Q 3/66
                                               379/243
(Continued)

FOREIGN PATENT DOCUMENTS

WO    WO-2016039963 A2    3/2016
WO    WO-2016039963 A3    3/2016

OTHER PUBLICATIONS

"U.S. Appl. No. 14/581,912, First Action Interview—Pre-Interview Communication dated Nov. 3, 2016", 4 pgs.
(Continued)

*Primary Examiner* — Kyung H Shin
(74) *Attorney, Agent, or Firm* — Schwegman Lundberg & Woessner/eBay

(57) ABSTRACT

In various example embodiments, a system and method for managing a server cluster are provided. An example method may include scheduling a first job on a first node, using a first resource manager, establishing a service for a second resource manager on a second node, wherein the service is allocated node resources of the second node, and attempting to schedule a second job on the first node, using the first resource manager. The method may include preempting the service on the second node, using the second resource manager, in response to the attempt to schedule the second job on the first node, and deallocating the node resources of the second node from the service. The method may include advertising, using a node manager of the first resource manager, available node resources of the second node, and scheduling the second job on the second node, using the first resource manager.

20 Claims, 12 Drawing Sheets

(51) Int. Cl.
*H04L 12/923* (2013.01)
*H04L 12/911* (2013.01)
*G06F 9/50* (2006.01)
*H04Q 3/66* (2006.01)

(52) U.S. Cl.
CPC .......... *H04L 47/762* (2013.01); *H04L 47/781* (2013.01); *H04Q 3/66* (2013.01)

(56) References Cited

U.S. PATENT DOCUMENTS

| | | | |
|---|---|---|---|
| 2004/0228279 | A1 | 11/2004 | Midtun et al. |
| 2009/0199193 | A1 | 8/2009 | Jackson |
| 2009/0276781 | A1 | 11/2009 | Chan et al. |
| 2013/0191843 | A1* | 7/2013 | Sarkar ................... G06F 9/5066 718/105 |
| 2014/0137104 | A1* | 5/2014 | Nelson ................ G06F 9/45558 718/1 |
| 2016/0072726 | A1 | 3/2016 | Soni et al. |

OTHER PUBLICATIONS

"U.S. Appl. No. 14/581,912, Notice of Allowance dated Feb. 13, 2017", Examiner Interview Summary from Feb. 13, 2017 included, 11 pgs.

"U.S. Appl. No. 14/581,912, Response filed Jan. 3, 2017 to First Action Interview—Pre-Interview Communication dated Nov. 3, 2016", 7 pgs.

"International Application Serial No. PCT/US2015/046132, International Preliminary Report on Patentability dated Mar. 23, 2017", 8 pgs.

"International Application Serial No. PCT/US2015/046132, International Search Report dated Nov. 13, 2015", 2 pgs.

"International Application Serial No. PCT/US2015/046132, Written Opinion dated Nov. 13, 2015", 6 pgs.

Tiwari, "Building Distributed Systems with Mesos", Retrieved from the Internet: <URL: http://abhishek-tiwari.com/post/builcling-distributed-systems-with-mesos>, (Sep. 10, 2015).

* cited by examiner

SYSTEMS AND METHODS FOR RESOURCE SHARING BETWEEN TWO RESOURCE ALLOCATION SYSTEMS

CLAIM OF PRIORITY

This application is a continuation of and claims the benefit of priority of U.S. application Ser. No. 14/581,912, filed Dec. 23, 2014, which claims the benefit of priority of India Provisional Patent Application Serial Number 2591/DEL/2014, filed Sep. 10, 2014, each of which is hereby incorporated by reference in its entirety.

BACKGROUND

In various examples, datacenters may use resource allocation systems to manage system resources. For example, a server may use a resource allocation system to direct requests for data access or page access to available servers. In various examples, a single task may be distributed across many computers in a datacenter or across datacenters.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Currently, datacenters may use a single resource allocation system to manage system resources. In some datacenters, multiple resource allocation systems may be used to process tasks. Running two resource managers independently may result in a statically partitioned datacenter. This may be undesirable because resources may be confined to being used under a single resource allocation system and the resources may not be easily shared.

One type of resource allocation system, Mesos, supports both services and analytics workloads well. Mesos is a two level scheduler and cluster manager. Another resource allocation system, YARN is often the default choice for users—such as users migrating from an environment in which Hadoop 1.0 is utilized for analytics/data processing. YARN is a resource negotiator and a single level scheduler that supports different types of analytical jobs. YARN is commonly used in a Hadoop 2.0 setup and acts as a replacement for the cluster resource management aspects of MapReduce. MapReduce was used as a cluster resource management in Hadoop 1.0 setups, and MapReduce is used for data processing in both Hadoop 1.0 and 2.0 setups (among other data processors in Hadoop 2.0).

Resource sharing between two resource allocation systems may include open architecture that allows a Mesos resource allocation system and a YARN resource allocation system to co-exist and share resources. Other resource management systems may also benefit from the shared allocation examples described herein. In an example, Mesos may be the resource manager for the datacenter. Sharing resources between two resource allocation systems may improve overall cluster utilization and may avoid statically partitioning resources amongst two separate clusters/resource managers.

Figures 1, 2:
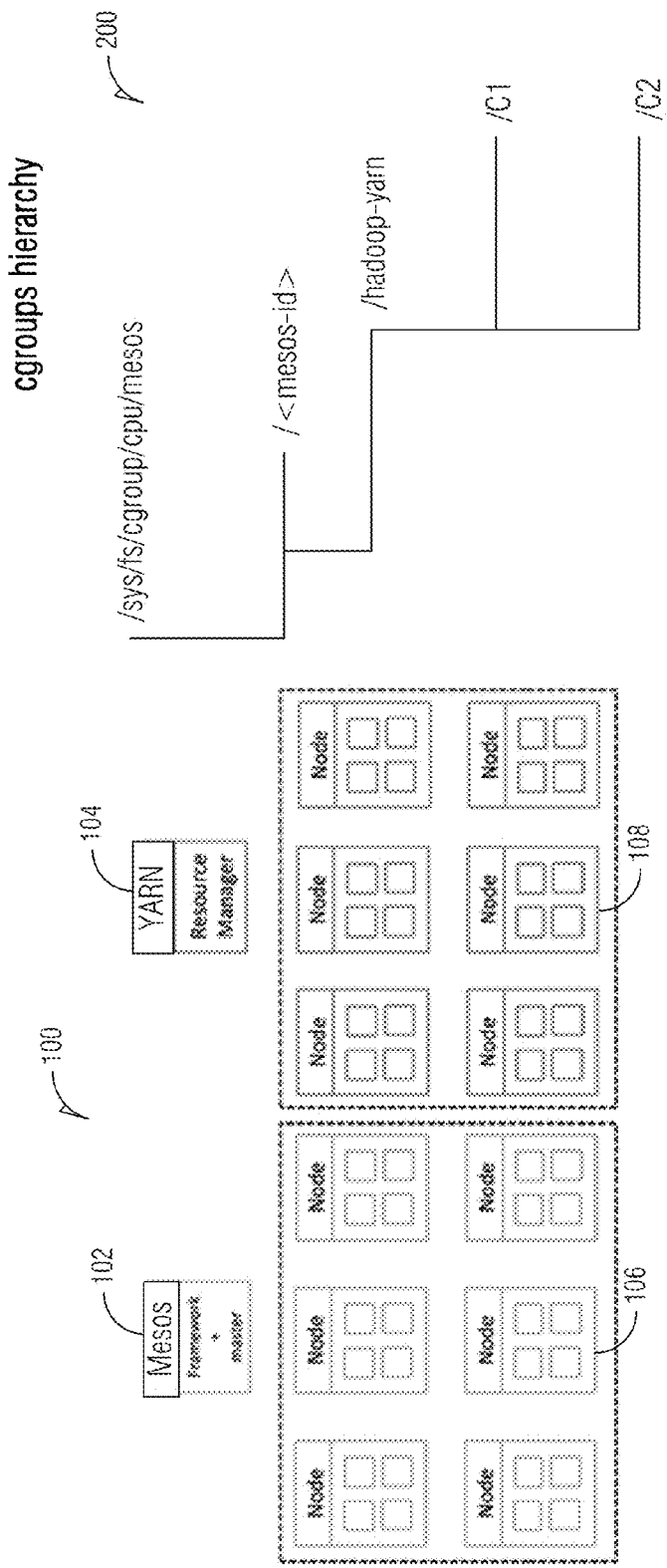
FIG. 1 is an example block diagram illustrating two resource management systems, according to example embodiments.
FIG. 2 is a diagrammatic representation of a cgroups hierarchy, according to example embodiments.

As stated above, running two resource managers independently may result in a statically partitioned datacenter. In an example, FIG. 1 illustrates a datacenter 100, using a Mesos resource manager 102 and a YARN resource manager 104. In an example, the datacenter 100 has statically partitioned nodes, such as node 106 and node 108 that may not share resources with more than one resource manager. For example, node 106 is illustrated under the Mesos framework with the Mesos resource manager 102 and it may not be used under the YARN resource manager 104. Similarly, node 108 is illustrated under the YARN resource manager 104 and may not be used under the Mesos resource manager 102. The statically partitioned datacenter 100 may not allow for optimal allocation of resources. For example, if the Mesos resource manager 102 wants additional resources it may not use the resources on node 108.

In various examples, a non-intrusive open architecture that combines resource managers (e.g., Mesos and YARN) to allocate system resources is described. In an example, the resource managers may be Mesos and YARN and the combination may not modify Mesos or YARN protocols. By not modifying Mesos or YARN protocols, future upgrade paths for Mesos and YARN may be more easily implemented, and the combined resource managers may be available for future upgrades as well. Another advantage of not modifying YARN protocols is that YARN/Hadoop cluster certifications by vendors may be made easier. The combined resource managers may leverage scheduling information from YARN from an external Control Plane to make decisions about providing or rescinding resources to YARN via Mesos. Other benefits of using the non-intrusive open architecture may be determined by analyzing the present disclosure.

In an example, a cluster is a group of resources in a datacenter, and a node within a cluster is a location where tasks are run. These tasks may be launched with help of a daemon which resides inside the node. For example, a daemon in the case of Mesos, is called a Mesos Slave, and in the case of YARN, is called a Node Manager.

In an example, a control groups (cgroups) Linux kernel feature allows aggregating or partitioning a set of tasks and future children tasks into hierarchical groups with respect to one or more subsystems. For example, when cgroups is enabled for a Central Processing Unit (CPU) subsystem, a task that is launched by a daemon (e.g., Mesos Slave) may go under a hierarchy, such as a parent task identification (<parent-task-id>).

FIG. 2 shows a diagrammatic representation of a cgroups hierarchy 200 where the <parent-task-id> is /sys/fs/cgroup/cpu/mesos/. During the lifecycle of the task, if the task launches one or more child tasks, the child tasks may be mounted in the cgroups hierarchy 200 under the parent task and may be configured to use the same amount of resources as the parent task. For example, the hierarchy for the child tasks with identification 1 and 2 may appear as: /sys/fs/cgroup/cpu/mesos/mesos-id/hadoop-yarn/C1 and /sys/fs/cgroup/cpu/mesos/mesos-id/hadoop-yarn/C2, where mesos-id, C1, and C2 may be given names specific to their locations or local identifications.

In an example, cgroups for Mesos Slave and YARN Node Manager may be enabled. For example, to enable cgroups for Mesos Slave, it may be started with a flag, such as: isolation=cgroups/cpu,cgroups/mem. To enable cgroups for YARN Node Manager, an addition may be made to yarn-site.xml for the YARN Node Manager. A configuration may mount YARN's cgroup hierarchy under Mesos, such as by using the example following code integrated with a 'yarn.nodemanager.linux-container-executor.cgroups.hierarchy' property:

```
<!-- cgroups -->
    <property>
        <description>who will execute(launch) the containers.</description>
        <name>yarn.nodemanager.container-executor.class</name>
    <value>org.apache.hadoop.yarn.server.nodemanager.
    LinuxContainerExecutor</value>
    </property>
    <property>
        <description>The class which should help the LCE handle
    resources.</description>
        <name>yarn.nodemanager.linux-container-executor.resources-
    handler.class</name>
    <value>org.apache.hadoop.yarn.server.nodemanager.util.
    CgroupsLCEResourcesHandler</value>
    </property>
    <property>
        <name>yarn.nodemanager.linux-container-executor.cgroups.
        hierarchy</name>
        <value>mesos/node-manager-task-id/hadoop-yarn</value>
    </property>
    <property>
        <name>yarn.nodemanager.linux-container-executor.
        cgroups.mount</name>
        <value>true</value>
    </property>
    <property>
        <name>yarn.nodemanager.linux-container-executor.
        cgroups.mount-path</name>
        <value>/sys/fs/cgroup</value>
    </property>
    <property>
        <name>yarn.nodemanager.linux-container-executor.group</name>
        <value>root</value>
    </property>
    <property>
        <name>yarn.nodemanager.linux-container-executor.path</name>
        <value>/usr/local/hadoop/bin/container-executor</value>
    </property>
```

Figure 3:
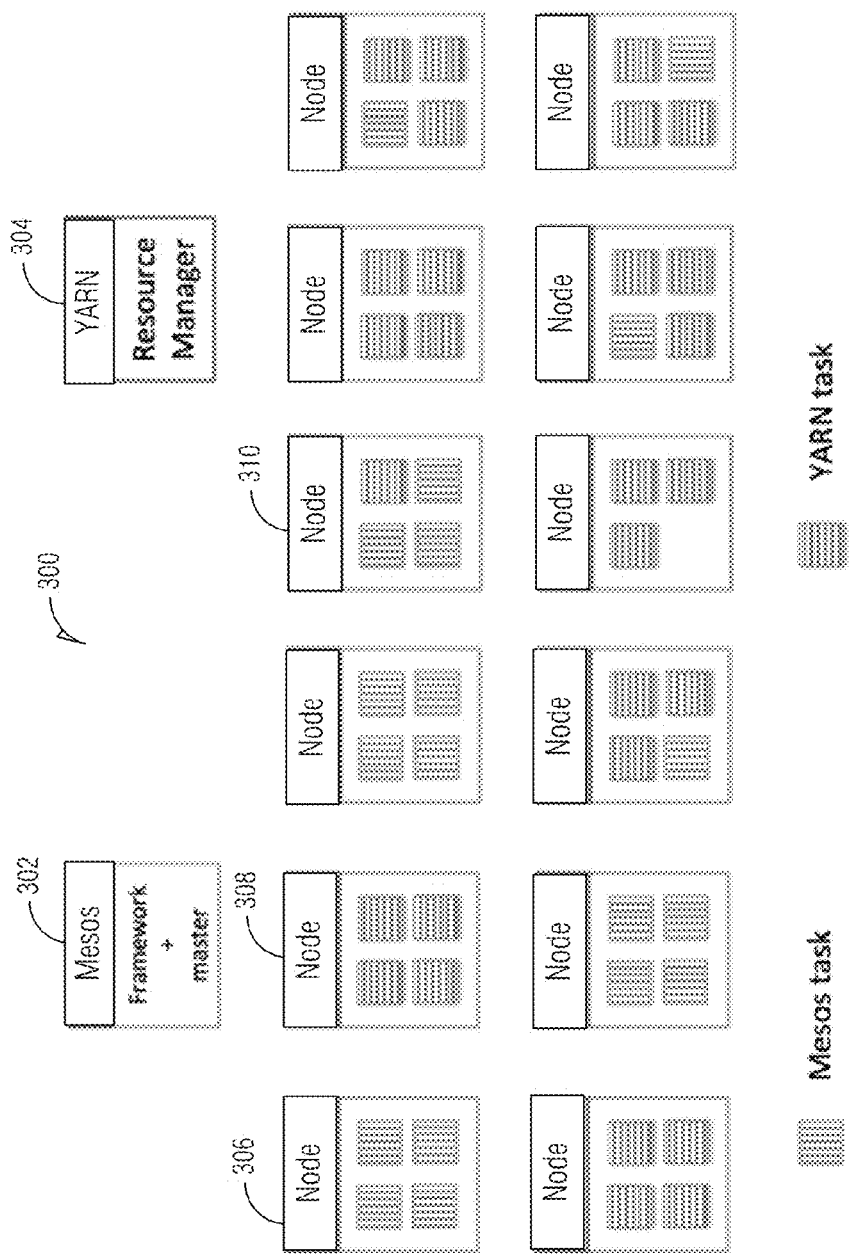
FIG. 3 is a diagrammatic representation of task management, according to example embodiments.

In an example, FIG. 3 is a diagrammatic representation of task management for a datacenter 300. The datacenter 300 may include a first resource manager 302 and a second resource manager 304 (e.g., Mesos and YARN). The datacenter 300 may include nodes 306, 308, and 310. In an example, node 306 has only Mesos tasks scheduled, node 308 has only YARN tasks scheduled, and node 310 has both Mesos tasks and YARN tasks scheduled. In an example, one way to avoid static partitioning and to enable resource sharing when running two resource managers is to let a primary resource manager be in control of the datacenter's resources. A secondary resource manager may then manage a subset of resources, and the primary resource manager may allocate the subset of resources to the secondary resource manager. In an example, Mesos may be used as the primary resource manager for the datacenter. In an example, YARN may be used as the secondary resource manager for the datacenter. As illustrated in FIG. 3, Mesos or YARN may schedule a task on any node.

In various examples, Mesos Slave and YARN's Node Manager are processes that run on a host Operating System (OS), and advertise available resources to a Mesos resource manager (Master) and a YARN resource manager respectively. Both processes may be configured to advertise a subset of resources. Using cgroups and the advertisement of a subset of resources may allow a Mesos Slave and a YARN Node Manager to co-exist on a node, such as illustrated in FIG. 4.

Figure 4:
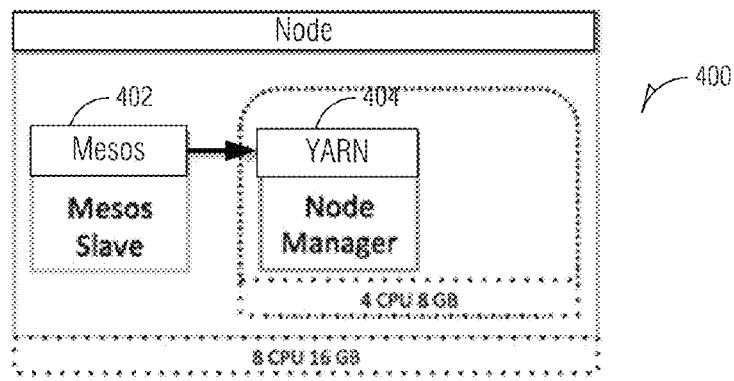
FIG. 4 is a diagrammatic representation of a node, according to example embodiments.

In an example, FIG. 4 is a diagrammatic representation of a node 400 including a first daemon of a first resource manager (e.g., a Mesos Slave 402 of a Mesos resource manager) controlling a second daemon of a second resource manager (e.g., a YARN Node Manager 404 of a YARN resource manager). In an example, the Mesos Slave 402 may advertise all of a node's resources to a Mesos resource manager (Master). For example a Mesos Slave 402 may advertise eight CPUs and 16 GB RAM as in FIG. 4. In this example, a YARN Node Manager 404 may be a Mesos task. The YARN Node Manager 404 Mesos task may be allotted a portion of the total resources advertised by the Mesos Slave 402, such as an allocation of four CPUs and eight GB RAM, and the Node Manager may be configured to advertise three CPUs and seven GB RAM.

The YARN Node Manager 404 may also be configured to mount YARN containers under the cgroup hierarchy as a Mesos task. For example, the containers may be mounted as: /sys/fs/cgroup/cpu/mesos/node-manager-task-id/container-1. This may allow the Mesos Slave 402 and the YARN Node Manager 404 to co-exist on the same node, in a non-intrusive way. The illustrated CPUs and available memory in FIG. 4 and throughout this disclosure are for illustration purposes—other amounts of CPUs or memory may be utilized without departing from the scope of this disclosure.

Figure 5:
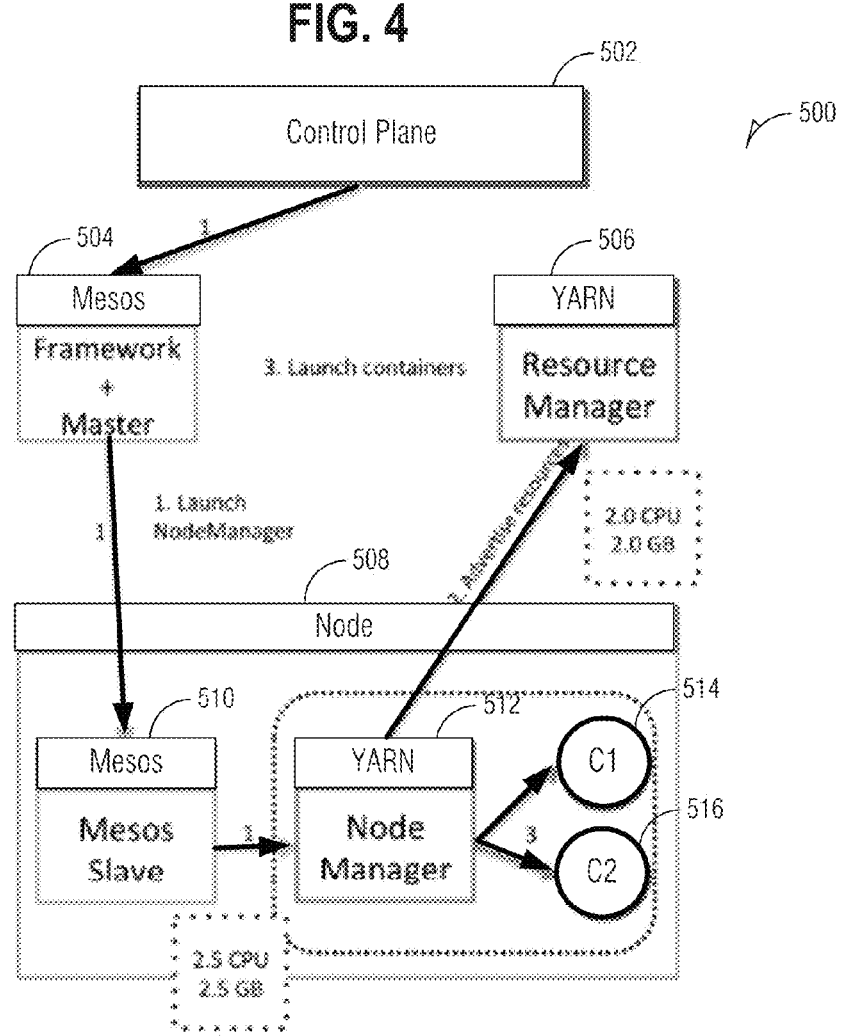
FIG. 5 is an example block diagram illustrating a dual resource manager integrated system, according to example embodiments.

FIG. 5 is an example block diagram illustrating a dual resource manager integrated system 500. In FIG. 5, a Control Plane 502 may be a module that makes decisions for managing resources between a YARN resource manager 506 and a Mesos resource manager 504. A Mesos resource manager (e.g., Framework and Master) may be a module that manages and executes jobs on a cluster.

In an example, an abstraction, such as a job may be provided. The job may be defined by an application, such as Apache Aurora or other scheduler. A job may include a collection of tasks that run on one or more nodes managed by a Mesos Slave 510. The Mesos Slave 510 may run a YARN Node Manager 512 as a task. The YARN Node Manager 512 may run a job, such as job C1 514 or job C2 516 using node resources of the node 508.

In an example method to be run on the system 500, the Control Plane 502 may instruct the Mesos resource manager 504 to, and the Mesos resource manager 504 may, launch the YARN Node Manager 512 as a task under the Mesos Slave

510. The Control Plane 502 may request Apache Aurora to increase the number of running YARN Node Manager instances. Aurora may pass the configuration and task launch information to the Mesos resource manager 504. The YARN Node Manager 512 may advertise available node resources on the node 508 to the YARN resource manager 506. The YARN resource manager 506 may launch containers to schedule jobs C1 514 and C2 516 on the node 508 under the YARN Node Manager 512 running as a task under the Mesos Slave 510.

In various examples, Mesos resource manager 504 (e.g., Master) may be manage the Mesos Slave(s) 510 or frameworks. The Mesos Slave 510 may be a daemon that runs on a node and is responsible for advertising available resources and launching tasks on a node. The YARN resource manager 506 may be a system similar to Mesos Master which manages the YARN Node Manager(s) 512 or YARN AppMasters. The YARN Node Manager 512 may be a daemon similar to the Mesos Slave 510 that is responsible for advertising resources and launching task containers on a node. In an example, the node 508 in a cluster may have the Mesos Slave 510 daemon and the YARN Node Manager 512 daemon installed. The Mesos Slave 510 daemon may be started on the node 508 and may advertise all available resources to the Mesos resource manager 504.

The YARN Node Manager 512 may be launched as a task under the Mesos Slave 510. Apache Aurora may be responsible for launching and managing the YARN Node Manager 512 instance on node 508. For example, in the system 500, the YARN Node Manager 512 is allotted 2.5 CPU and 2.5 GB RAM. The YARN Node Manager 512, upon startup, advertises configured resources to the YARN resource manager 506. In the example in FIG. 5, two CPU and two GB RAM are advertised. The YARN resource manager 506 may launch containers via the YARN Node Manager 512. The launched containers may be mounted under the configured cgroup hierarchy, as explained above.

In an example, the architecture using two resource allocation systems may be used to handling starvation for services, in a traffic spike scenario. For example, the architecture may leverage resources from an existing YARN/Hadoop cluster, such as during a peak traffic scenario to launch application services. Separate Hadoop and service clusters may be retained, such as when the Hadoop clusters have different hardware and network setups than the application cluster.

Figure 6:
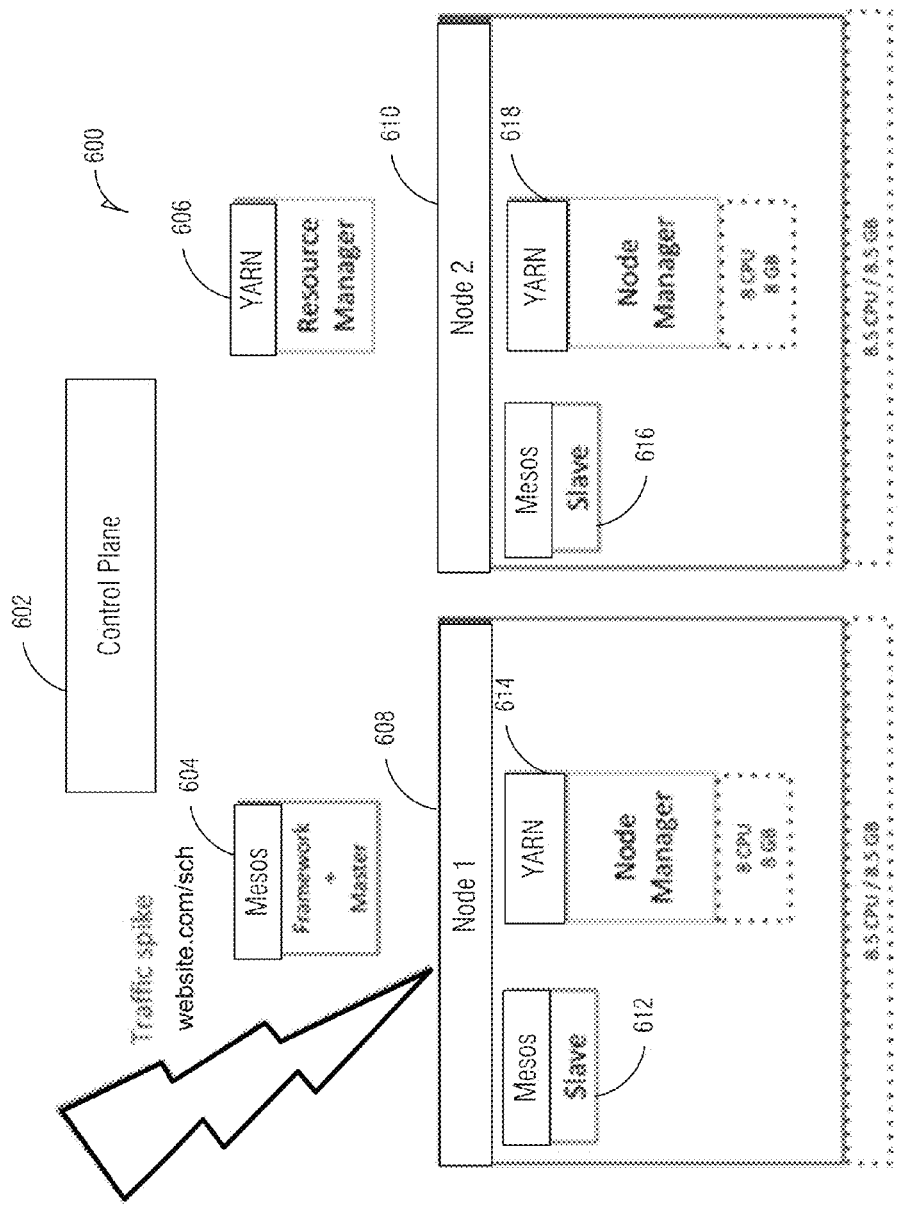
FIGS. 6-8 are example operations in a first process flow of resource allocation, according to example embodiments.
Figure 7:
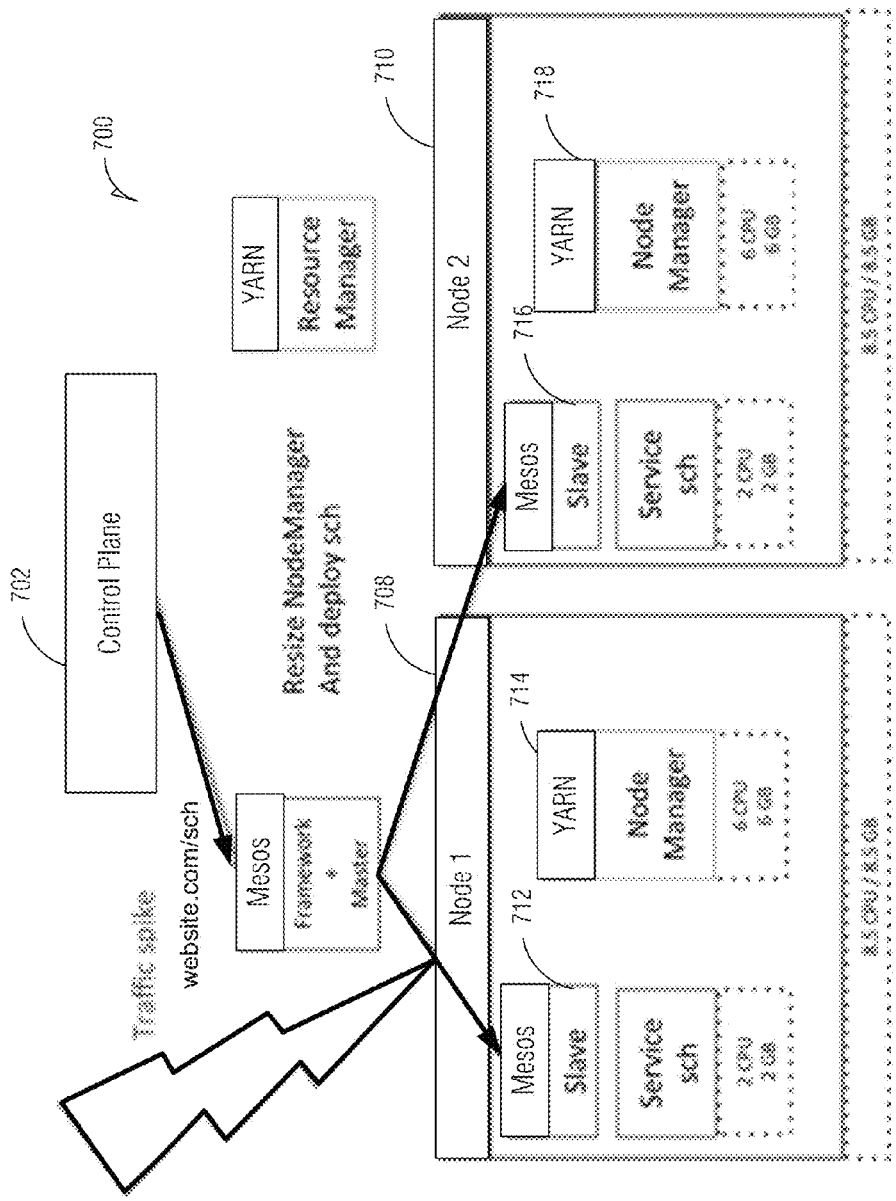
Figure 8:
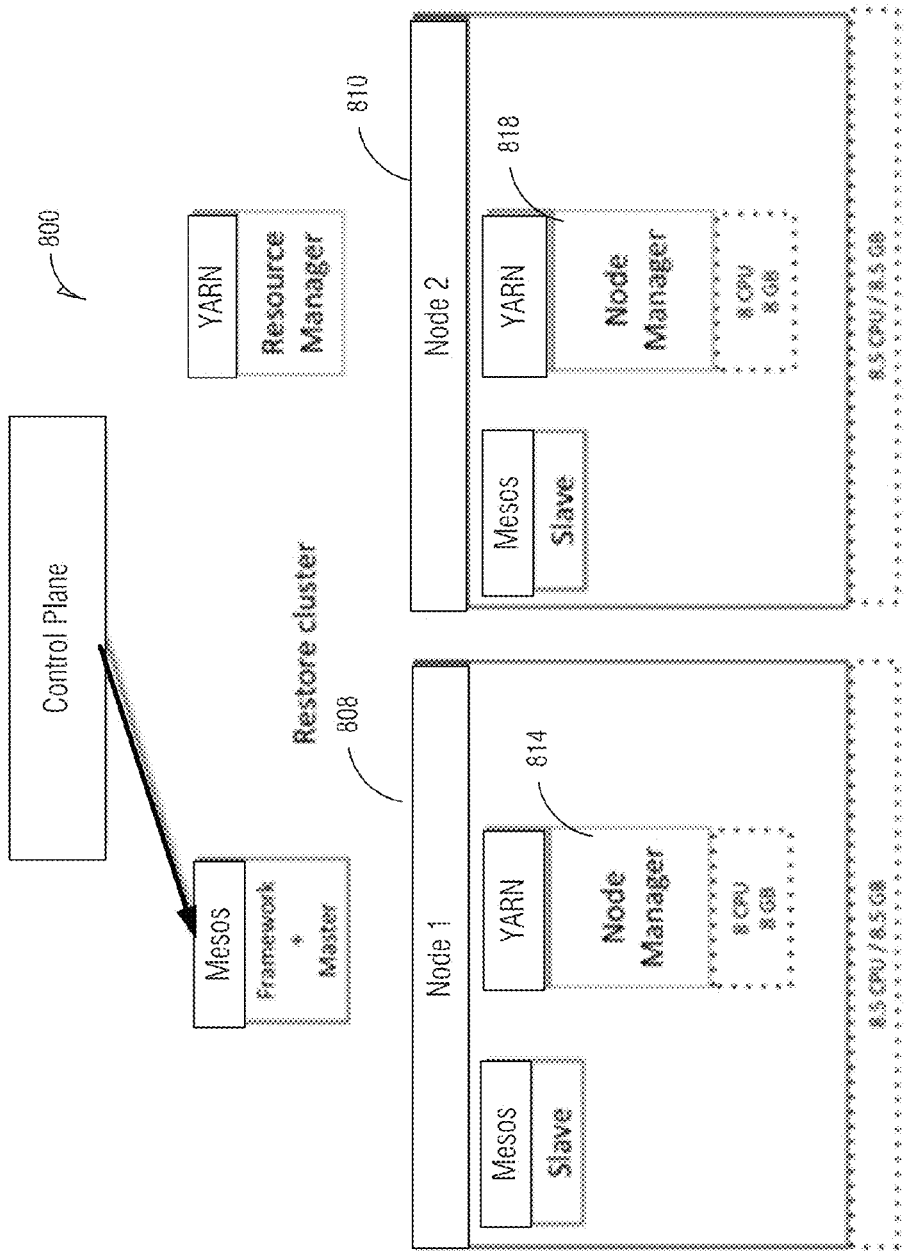

FIGS. 6-8 are example operations in a first process flow of resource allocation in a traffic spike scenario. For example, a Mesos Slave may be run as the primary resource manager's daemon on each node and YARN's Node Manager may be launched as the only task for the Mesos Slave. Under normal operation, Node Manager may run with full capacity (large profile), and under a spike situation the Node Manager may be vertically scaled down (small profile).

In a traffic spike situation without the dual Mesos and YARN architecture, a service, for example 'website.com/sch', may cause the service cluster to run at a high temperature and the service may be unable to meet the required Service Level Agreement (SLA). Without the dual architecture, the spike may not be handled, as the service 'sch' cluster should be flexed up but there are no spare resources in Mesos cluster to perform this flex up.

In the Mesos/YARN architecture 600, illustrated in FIG. 6, the Control Plane 602 may detect the presence of a traffic spike and make a decision to increase the number of running instances for 'service sch'. In this example, there are not enough resources available to run new 'service sch' instances on node 1 (608) and node 2 (610). Accordingly, the Control Plane 602 may vertically scale down a YARN Node Manager 614 or 618 using Aurora/Mesos. In doing so, the YARN Node Manager 614, for example, may restart with fewer resources allotted to it and create extra capacity for a Mesos resource manager 604 to schedule 'service sch' instances on nodes 608 and 610 under Mesos Slaves 612 and 616 respectively.

FIG. 7 shows architecture 700 with YARN Node manager 714 and YARN Node Manager 718 allocated fewer resources (e.g., six CPU and six GB instead of the eight CPU and eight GB allotted to the YARN Node Managers 614 and 618 in FIG. 6). Once the traffic spike ends, the Control Plane 702 may issue a restore flow, and may terminate the extra 'service sch', running on nodes 1 and 2 (708 and 710) under Mesos Slaves 712 and 716 respectively, that were launched to handle the traffic spike.

FIG. 8 shows architecture 800 after the extra 'service sch' are stopped on nodes 1 and 2 (808 and 810). The YARN Node Managers 814 and 818 may then be vertically scaled up (e.g., back to eight CPU and eight GB).

In an example, a process on the architectures 600, 700, and 800 in FIGS. 6-8 may include: wait for traffic spike signal from monitoring system, retrieve scheduling data and cluster metrics from YARN resource manager (e.g., 606). The process may include, determining nodes where YARN Node Manager can be vertically scaled down (e.g., nodes 1 and 2—608 and 610). The process may include, calling aurora to vertically scale down YARN Node Manager (e.g., 614 and 618) on identified nodes (608 and 610), by changing the running profile from large to small. The process may include, waiting for monitoring system to signal that the traffic spike has ended, and calling aurora to vertically scale up YARN Node Manager (e.g., 714 and 718) on identified nodes (e.g., 708 and 710), by changing the running profile from small to large (e.g., restore cluster as shown in FIG. 8).

In an example, restarting YARN Node Manager may kill all its child containers. Although the killed child containers may be rescheduled by YARN, the work performed is lost, such as by using YARN-1336. In another example, restarting YARN Node Manager may not kill all its child containers. Restarting a YARN Node Manager that runs a YARN AppMaster may be disruptive, as it may kill the YARN AppMaster container. Once the YARN AppMaster container is killed, YARN may kill all the child containers for that YARN AppMaster. The technique that identifies nodes for vertical scale down may be configured to avoid picking nodes that run YARN AppMaster (e.g., best effort), such as using YARN-1489.

In various examples, a Control Plane is responsible for making important decisions regarding resource allocation. In an example, a Control Plane may make such decisions in a well-informed, intelligent manner. In various examples, the current REST API provided by Hadoop/YARN is not able to provide enough information to make smart choices about granting or rescinding resources. A new Hadoop/YARN API may be used instead, which further exposes information from YARN's scheduler. This new API may give a snapshot of the Resource Requests being made by YARN App Masters at a point in time. The new API may also be capable of exposing requests to create "container 0", also known as the YARN AppMaster.

In various examples, the API provides an Application level granularity of resource requests. Using the API, a user may know how much memory, how many virtual cores, or locality constraints for each application. With a richer set of data to work with, the Control Plane may be able to make better decisions, further optimizing the use of resources in the data center. An example YARN API is provided below:

```
                            Yarn API

<resourceRequests>
    <MB>102400</MB>
    <VCores>100</VCores>
    <appMaster>
        <applicationId>application_1408388286628_0002</applicationId>
<applicationAttemptId>appattempt_1408388286628_0002_000001
</applicationAtt
emptId>
        <queueName>default</queueName>
        <totalMB>102400</totalMB>
        <totalVCores>100</totalVCores>
        <numResourceRequests>1</numResourceRequests>
        <resourceRequests>
            <request>
                <MB>1024</MB>
                <VCores>1</VCores>
                    <resourceNames>
                    <resourceName>/default-rack</resourceName>
                    <resourceName>*</resourceName>
                    <resourceName>master</resourceName>
                    </resourceNames>
                <numContainers>100</numContainers>
                <relaxLocality>true</relaxLocality>
                <priority>20</priority>
            </request>
        </resourceRequests>
    </appMaster>
</resourceRequests>
```

In another example, a single cluster for Hadoop and Services/Scaling YARN may be used. Using a single cluster, a job may run anywhere in the datacenter. In an example, a datacenter using a single cluster may have no dedicated clusters. The datacenter with the single cluster may horizontally scale node managers. For example, a scenario where YARN is unable to schedule containers because it has run out of resources would function differently with a single cluster datacenter than a multiple cluster datacenter. If the datacenter has multiple clusters using dedicated clusters, YARN may wait until enough resources are freed up to schedule pending containers. A datacenter using a single cluster may and the new described architecture, may eliminate static partitioning and enable resource sharing. The datacenter with a single cluster may allow YARN to schedule containers without waiting. An example of a datacenter with a single cluster is shown in FIG. 3.

Resources may be provided for YARN on demand in a single cluster datacenter. For example, a user may submit a MapReduce job to YARN and a YARN resource manager may schedules a YARN AppMaster container on a YARN Node Manager. If YARN is unable to schedule Map and Reduce containers for a YARN MRAppMaster because of a lack of resources, the Control Plane may detect starvation using various YARN APIs including newly introduced resource requests API (YARN-2408). In an example, Mesos and YARN may be combined to create one unified cluster per datacenter. YARN and Mesos tasks may co-exist on a node, and resources may be provisioned on demand.

Figure 9:
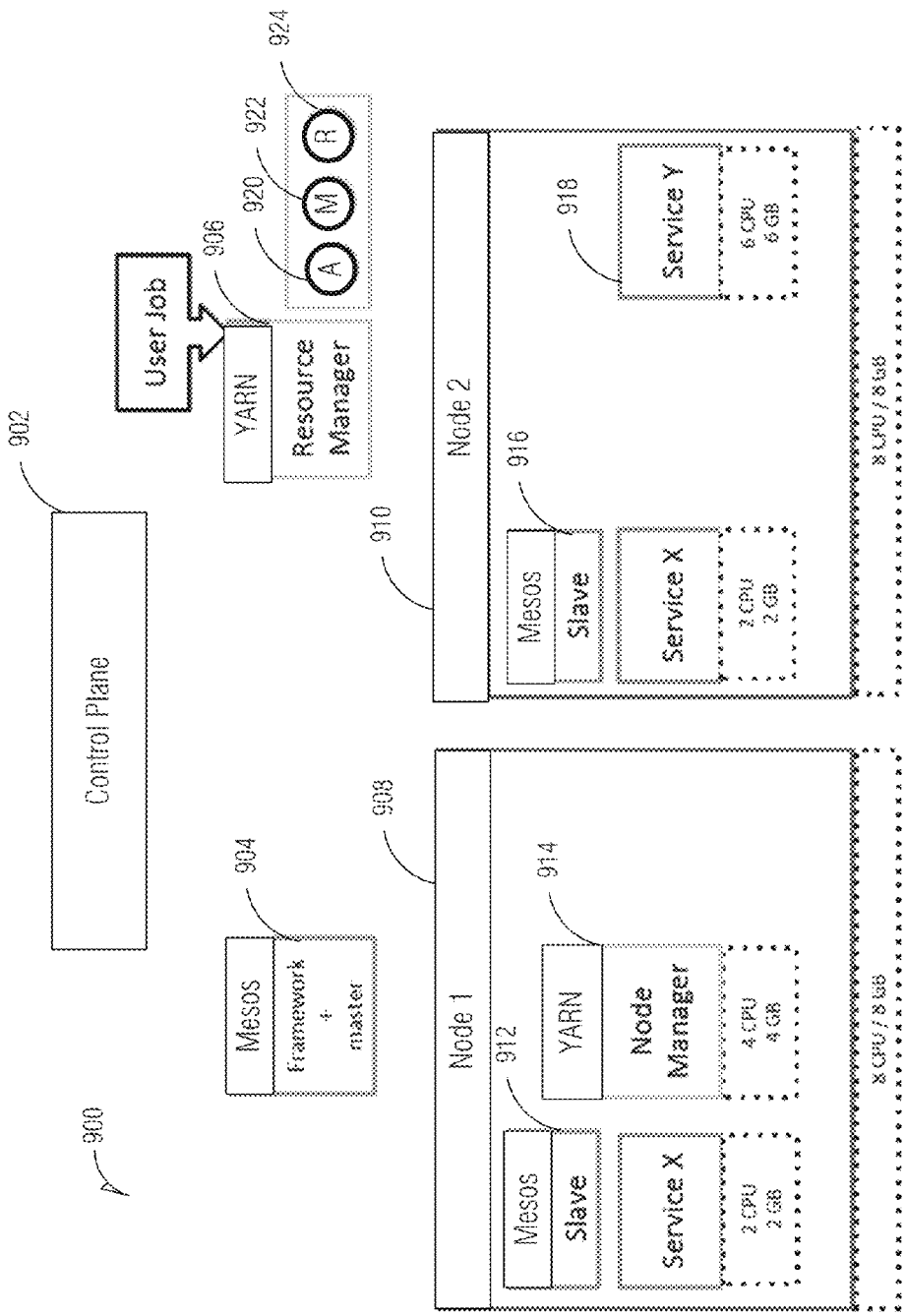
FIGS. 9-13 are example operations in a second process flow of resource allocation, according to example embodiments.

FIGS. 9-13 are example operations in a second process flow of resource allocation, according to example embodiments. FIG. 9 shows architecture 900 including a Control Plane 902, Mesos resource manager 904 and YARN resource manager 906. The architecture 900 includes jobs A 920, M 922, and R 924.

Figure 10:
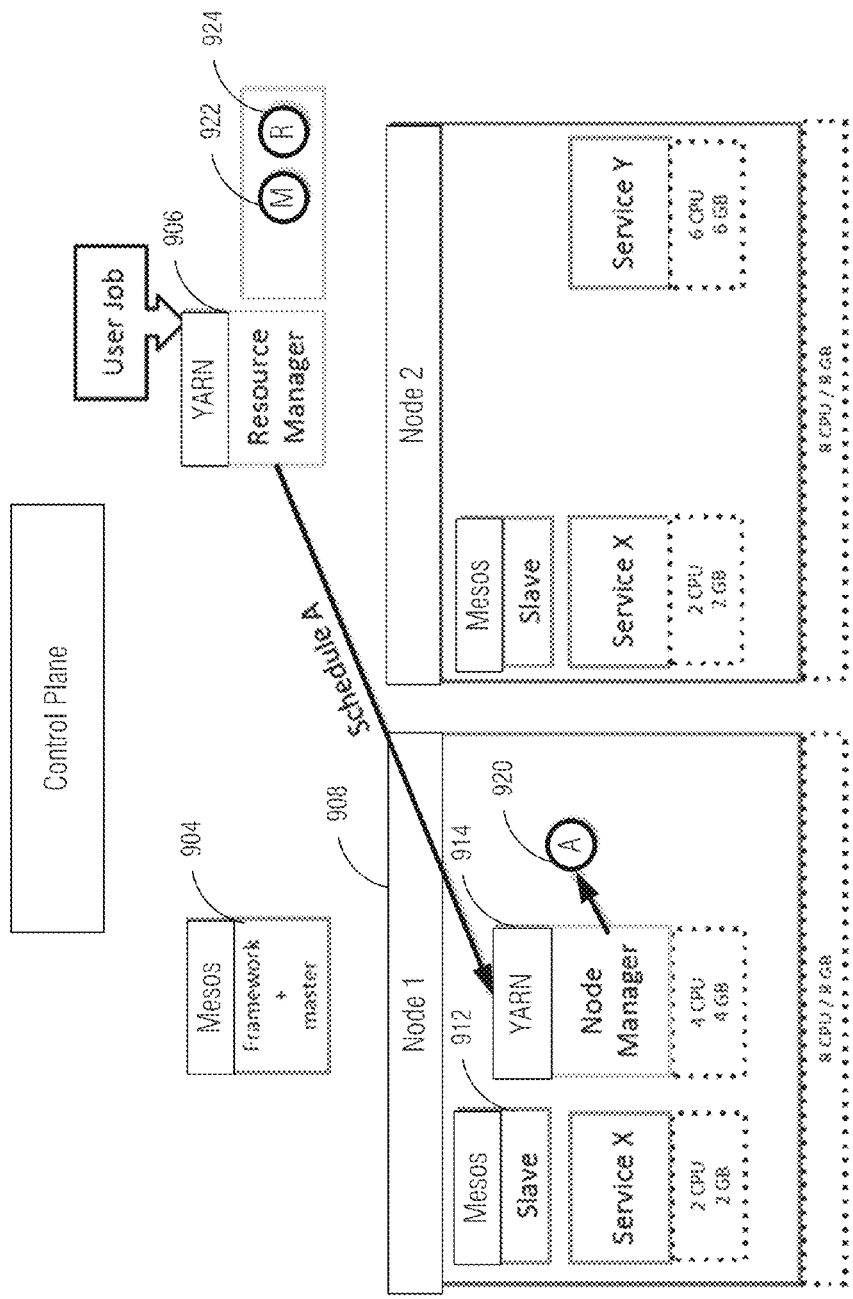

FIG. 9 shows the job A 920 waiting to be scheduled. FIG. 10 shows the job A 920 scheduled by the YARN resource manager 906 on a node 1 (908) using a YARN Node Manager 914 that may be a task of a Mesos Slave 912 under the Mesos resource manager 904. In an example, the YARN resource manager 906 may attempt to schedule job M 922 or job R 926.

Figure 11:
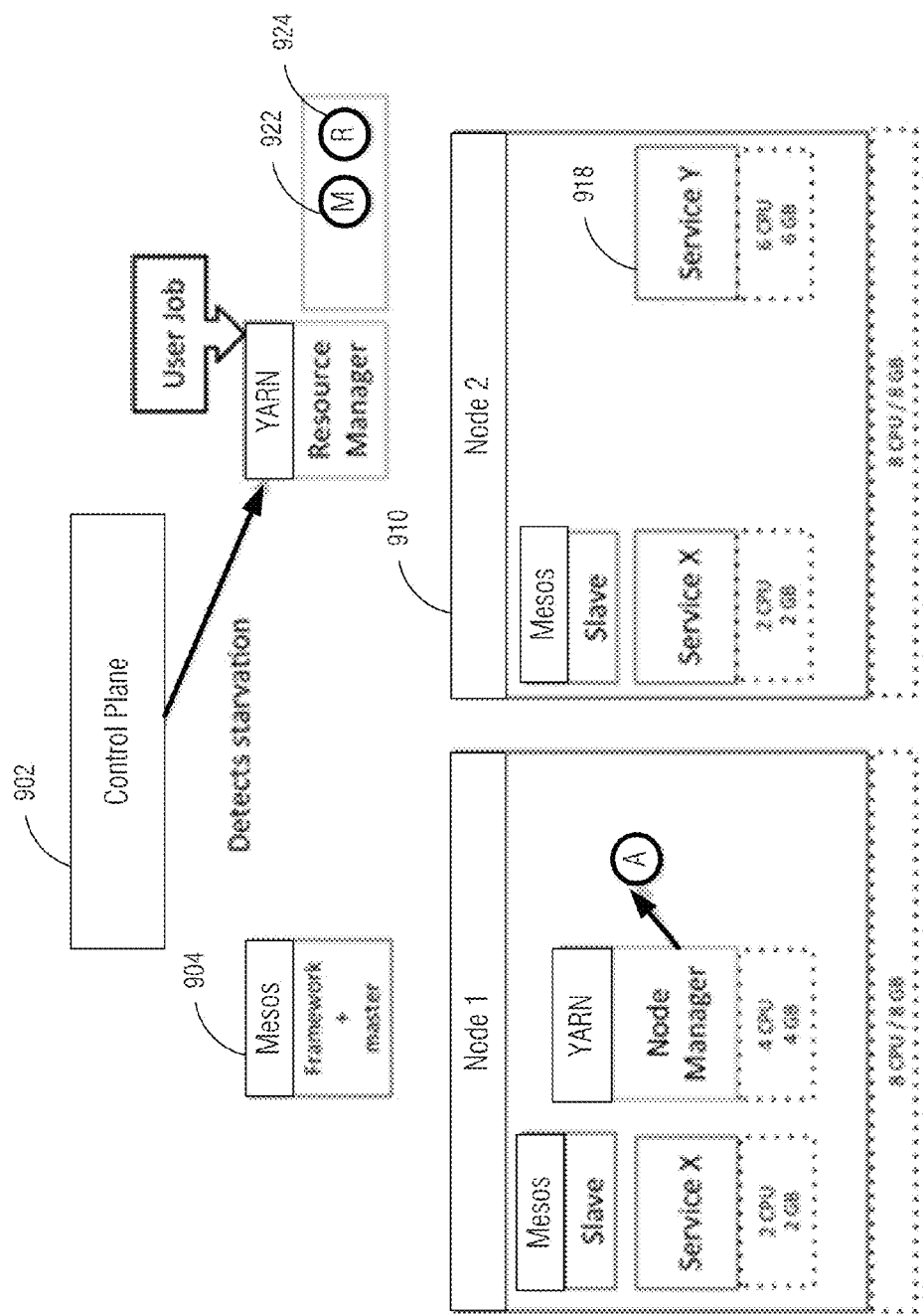

FIG. 11 shows the Control Plane 902 that may detect starvation. Starvation may occur when there are not enough resources on a node when a job is attempted to be schedule on the node. For example, when the YARN resource manager 906 attempts to schedule job M 922 or job R 926 on Node 1 (908), job A 920 may already be running under the YARN Node Manager 914 Furthermore, node 1 (908) may have insufficient resources to schedule jobs M or R (922 or 924). The Control Plane 902 may detect this starvation of resources, and give the Mesos resource manager 904 further instructions for scheduling the jobs M 922 and R 924. The Control Plane 902 may direct the Mesos resource manager 904 to preempt Service Y 918 running on Node 2 (910). In an example, the Mesos resource manager 904 may preempt Service Y 918 and deallocate node resources from Service Y 918.

Figure 12:
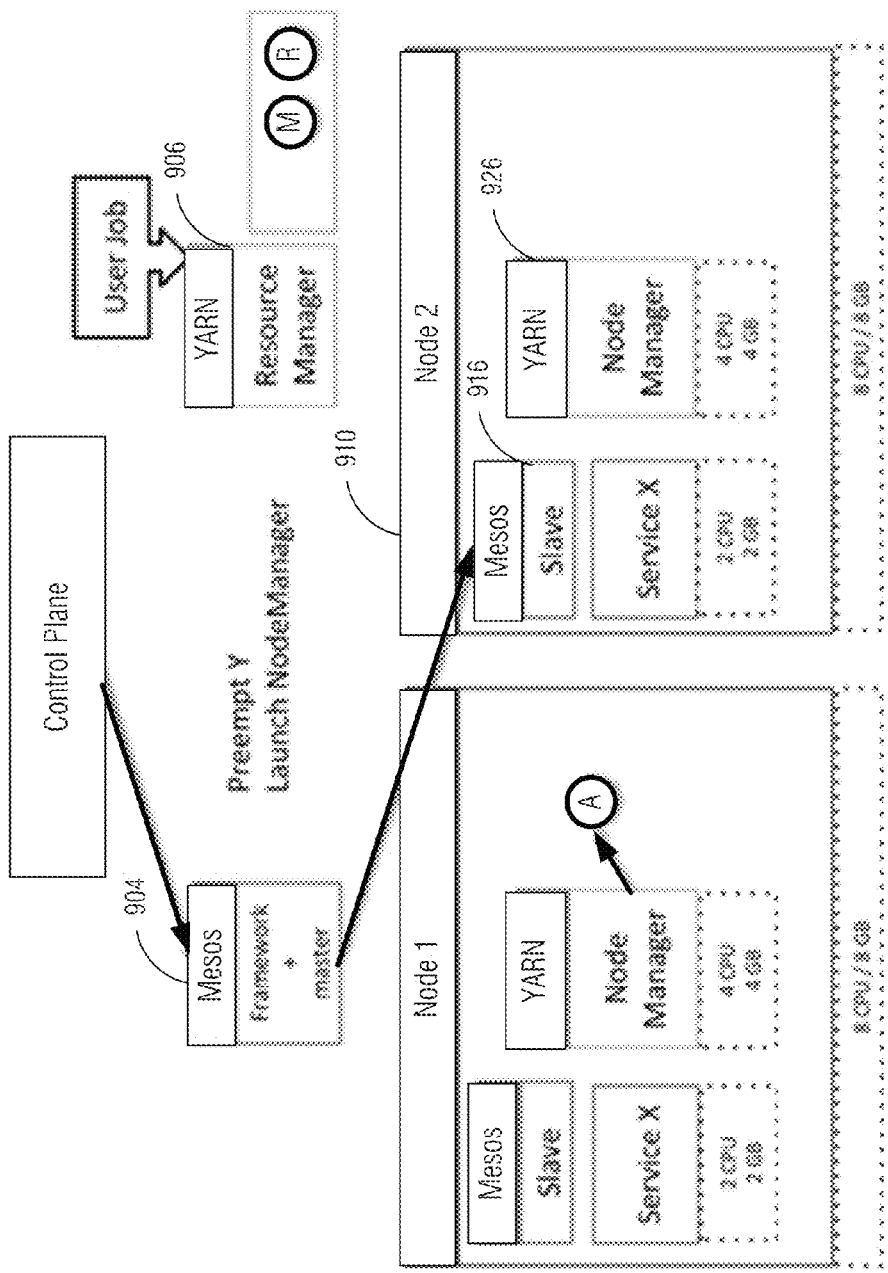

FIG. 12, in an example, shows the Mesos resource manager 904 directing the Mesos Slave 916 to launch a YARN Node Manager 926 on node 2 (910) as a task under the Mesos Slave 916, with the YARN Node Manager 926 under the YARN resource manager 906. The YARN Node Manager 926 may be allocated some or all of the available resources on node 2 (910). For example, in FIGS. 11-12, Service Y 918 is shown with node resources of six CPU and six GB which are deallocated by the Mesos resource manager 904. The YARN Node Manager 926 is shown with four CPU and four GB allocated by the Mesos resource manager 904. In the examples in FIGS. 9-13, an additional service, Service X is shown under the Mesos Slave (912) on node 1 (908). Service X may or may not be present when using techniques described related to these figures.

Figure 13:
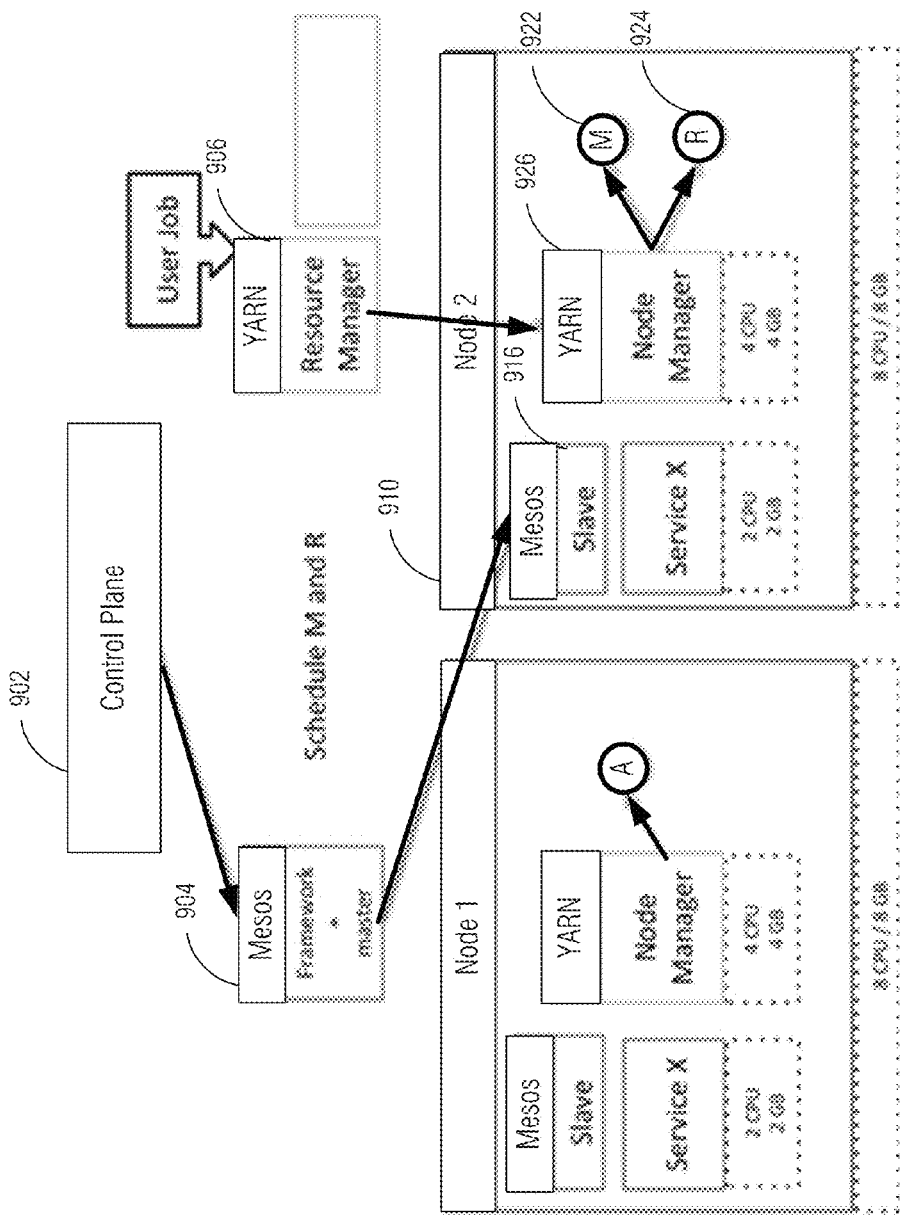

FIG. 13, in an example, shows the Control Plane 902 directing the Mesos resource manager 904 to instruct the Mesos Slave 916 on node 2 (910) to allow the YARN Node Manager 926 to broadcast available node resources to the YARN resource manager 906. The YARN resource manager 906 may schedule job M 922 or job R 924 to run on node 2 (910) on the YARN Node Manager 926 running as a task under the Mesos Slave 916 controlled by the Mesos resource manager 904.

To schedule jobs M 922 or R 924, a new YARN API, such as YARN-2408 may be implemented. The new YARN API may include Resource Requests snapshot API: memory, virtual cores, or locality constraint. The API may include REST API with JSON & XML output, and may be non-intrusive, by exposing more information from the resource manager. The API may help the Control Plane decide Node Manager sizing.

In various examples, the Control Plane uses pre-configured policies to determine if the starving YARN AppMasters should get resources (e.g., business critical workload). In an example, the Control Plane may preempt a task of lower priority, and horizontally scale a Node Manager. For example, the Service Y 918 may be preempted if it is a lower priority than the jobs M 922 or R 924, and the YARN Node Manager 926 may be launched. Once the YARN Node Manager 926 is available, YARN resource manager 906 may start scheduling containers.

In various example, the above systems may be used by the Control Plane for horizontal scaling. For example, horizontal scaling may include, retrieving scheduling data and cluster metrics from YARN resource manager 906, and detecting YARN starvation using the following APIs: ResourceRequests (YARN-2408), and metrics (/ws/vl/cluster/metrics). The scaling may include, determining a lower priority Mesos task (e.g., Service Y 918) that may be pre-empted to free up resources to launch Node Manager, calling aurora to kill the identified task, and calling aurora to horizontally scale out the YARN Node Manager 926. In various examples, a vertical scaling strategy may also be used.

In an example, the Control Plane may include a Mesos framework. It may also include a design scope including: configurations to flex up or down, vertically or horizontally. It may include determining YARN Node Manager profile for flex up, such as small (two CPU, four GB RAM) or large (eight CPU, 24 GB RAM). It may also include choosing a YARN Node Manager to flex down, which may allow avoiding a YARN Node Manager running a YARN App-Master container or whose child containers are important, such as HBase zone servers.

In various examples, the Control Plane may utilize various factors to intelligently make resource sharing decisions and the challenges they impose such as quotas and priorities. In various examples, quotas, priorities and other factors may mean different things for different organizations. There may not be a single Control Plane technique to fit the needs of each situation. In various examples, quotas may be defined at multiple levels and may mean different things for different workloads. For instance, resource quota may be defined at a resource manager level in terms of the amount of resources each resource manager is guaranteed to possess at any time. Another way to define quotas is at a workload level, which may mean response SLA for application services and processing time SLA for data processing jobs. In various examples, the notion of priorities helps the Control Plane to identify workload units that should not be preempted. Sharing resources may improve utilization and reduce cost of operation, but, in various examples, may not be done at cost of disruption of critical services, and reducing overall availability.

There may be a plethora of workload groups that run across a datacenter, such as web applications, application services, database servers, batch jobs, data processing jobs, etc. Priorities may be defined hierarchically, across workload groups and within workload groups. For example, all web applications may be of a higher priority than all batch jobs. Within the web applications, a checkout application may be of a higher priority than a help web application or a help web application may not be a higher priority than a billing batch job. Alternatively, priorities may be defined per workload unit, where the priority order may be defined across workload groups, allowing one to classify a billing batch job more important than a help web application. In an example, Aurora may be used as a framework, and thermos as an executor, although other frameworks or executors may be used interchangeably. In an example, a Control Plane, (e.g., the system that orchestrates resource sharing between Mesos and YARN), may be made a Mesos framework, for better control.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 14:
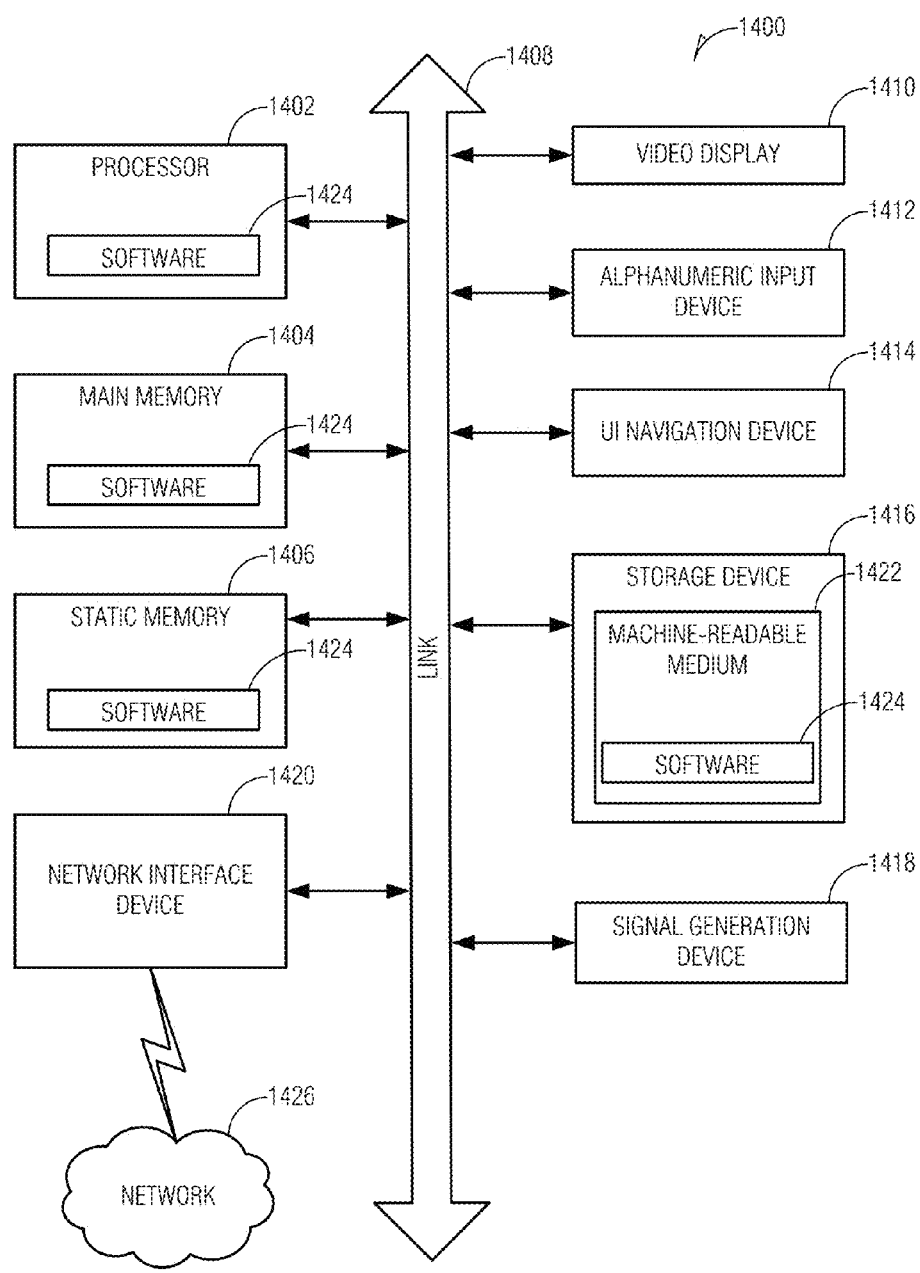
FIG. 14 is a block diagram of machine in the example form of a computer system within which a set instructions, for causing the machine to perform any one or more of the methodologies discussed herein, may be executed, according to example embodiments.

FIG. 14 is a block diagram illustrating a machine in the example form of a computer system 1400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1400 includes at least one processor 1402 (e.g., a central processing unit (CPU), a graphics processing unit (GPU) or both, processor cores, compute nodes, etc.), a main memory 1404 and a static memory 1406, which communicate with each other via a link 1408 (e.g., bus). The computer system 1400 may further include a video display unit 1410, an alphanumeric input device 1412 (e.g., a keyboard), and a user interface (UI) navigation device 1414 (e.g., a mouse). In one embodiment, the video display unit 1410, input device 1412 and UI navigation device 1414 are incorporated into a touch screen display. The computer system 1400 may additionally include a storage device 1416 (e.g., a drive unit), a signal generation device 1418 (e.g., a speaker), a network interface device 1420, and one or more sensors (not shown), such as a global positioning system (GPS) sensor, compass, accelerometer, or other sensor.

The storage device 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404, static memory 1406, and/or within the processor 1402 during execution thereof by the computer system 1400, with the main memory 1404, static memory 1406, and the processor 1402 also constituting machine-readable media.

While the machine-readable medium 1422 is illustrated in an example embodiment to be a single medium, the term "machine-readable medium" may include a single medium or multiple media (e.g., a centralized or distributed database, and/or associated caches and servers) that store the one or more instructions 1424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1424 may further be transmitted or received over a communications network 1426 using a transmission medium via the network interface device 1420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

VARIOUS NOTES & EXAMPLES

Each of these non-limiting examples can stand on its own, or can be combined in various permutations or combinations with one or more of the other examples.

Example 1 includes the subject matter embodied by a system for managing a server cluster comprising: a first resource manager of a control plane to: schedule a first job on a first node, and attempt to schedule a second job on the first node, and a second resource manager of the control plane to: preempt, in response to the attempt to schedule the second job on the first node, a service on the second node, wherein the service is allocated node resources of the second node, and deallocate the node resources of the second node from the service, and wherein a node manager of the first resource manager on the second node broadcasts available node resources of the second node and wherein the first resource manager is to schedule the second job on the second node.

In Example 2, the subject matter of Example 1 can optionally include wherein the service is run by a slave of the second resource manager.

In Example 3, the subject matter of one or any combination of Examples 1-2 can optionally include wherein the node manager is a task run under the slave of the second resource manager.

In Example 4, the subject matter of one or any combination of Examples 1-3 can optionally include wherein the available node resources are resources available to the node manager.

In Example 5, the subject matter of one or any combination of Examples 1-4 can optionally include wherein the available node resources are a subset of the node resources of the second node.

In Example 6, the subject matter of one or any combination of Examples 1-5 can optionally include wherein the second job on the second node is run by the node manager and the first job on the first node is run by another node manager.

In Example 7, the subject matter of one or any combination of Examples 1-6 can optionally include wherein the first node and the second node are on the server cluster.

In Example 8, the subject matter of one or any combination of Examples 1-7 can optionally include wherein the second resource manager is further to reschedule the service on a third node.

In Example 9, the subject matter of one or any combination of Examples 1-8 can optionally include wherein the second resource manager is further to reschedule the services on the first node after the first job is complete.

In Example 10, the subject matter of one or any combination of Examples 1-9 can optionally include wherein the second resource manager is further to reschedule the service on the second node after the second job is complete.

Example 11 includes the subject matter embodied by a method for managing a server cluster comprising: scheduling a first job on a first node, using a first resource manager, establishing a service for a second resource manager on a second node, wherein the service is allocated node resources of the second node, attempting to schedule a second job on the first node, using the first resource manager, preempting the service on the second node, using the second resource manager, in response to the attempt to schedule the second job on the first node, deallocating the node resources of the second node from the service, broadcasting, using a node manager of the first resource manager, available node resources of the second node, and scheduling the second job on the second node, using the first resource manager.

In Example 12, the subject matter of Example 11 can optionally include wherein establishing the service includes running the service using a slave of the second resource manager.

In Example 13, the subject matter of one or any combination of Examples 11-12 can optionally include further comprising running the node manager as a task under the slave of the second resource manager.

In Example 14, the subject matter of one or any combination of Examples 11-13 can optionally include wherein the available node resources are resources available to the node manager.

In Example 15, the subject matter of one or any combination of Examples 11-14 can optionally include further comprising rescheduling the service on one of: the first node after the first job is complete, the second node after the second job is complete, or a third node.

Example 16 includes the subject matter embodied by a machine-readable medium including instructions for operation of a computing system, which when executed by a machine, cause the computing system to: schedule a first job on a first node, using a first resource manager, establish a service for a second resource manager on a second node, wherein the service is allocated node resources of the second node, attempt to schedule a second job on the first node, using the first resource manager, preempt the service on the second node, using the second resource manager, in response to the attempt to schedule the second job on the first node, deallocate the node resources of the second node from the service, broadcast, using a node manager of the first resource manager, available node resources of the second node, and schedule the second job on the second node, using the first resource manager.

In Example 17, the subject matter of Example 16 can optionally include wherein to establish the service includes to run the service using a slave of the second resource manager.

In Example 18, the subject matter of one or any combination of Examples 16-17 can optionally include further comprising: run the node manager as a task under the slave of the second resource manager.

In Example 19, the subject matter of one or any combination of Examples 16-18 can optionally include wherein the available node resources are resources available to the node manager.

In Example 20, the subject matter of one or any combination of Examples 16-19 can optionally include further comprising: reschedule the service on one of: the first node after the first job is complete, the second node after the second job is complete, or a third node.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A computer system for managing a server cluster, the computer system comprising:
   at least one processor; and
   a machine-readable medium coupled with the at least one processor, the machine-readable medium comprising instructions for operation of the computer system, which when executed by the at least one processor, cause the computing system to perform operations comprising:
   detecting, by a control plane module, a traffic spike determining, by the control plane module, that there are insufficient resources available on a first node associated with a first resource manager and a second node associated with a second resource manager to increase the number of instances of a service; and vertically scaling down the first resource manager such that the first resource manager restarts with fewer resources allocated to it and creates extra capacity for the second resource manager to schedule additional instances of the service on the first node and the second node.

2. The computer system of claim 1, the operations further comprising:

detecting, by the control plane module, an attempt to schedule a job on the first node by the first resource manager;

determining, by the control plane module, that there are insufficient resources available on the first node for the job;

instructing, by the control plane module, the second resource manager to preempt a second service running on the second node allocated node resources on the second node, wherein the second resource manager deallocates the node resources on the second node for the second service that is allocated the node resources of the second node;

wherein the first resource manager schedules the job on the second node.

3. The computer system of claim 2, wherein the second service is run by a slave of the second resource manager.

4. The computer system of claim 2, wherein the second resource manager instructs a slave of the second resource manager on the second node to allow a node manager of the first resource manager to broadcast available node resources to the first resource manager.

5. The computer system of claim 2, further comprising:

determining, by the control plane module, that the second service allocated node resources on the second node, is a lower priority than the second job and, based on the determination that the second service is a lower priority than the second job, instructing the second resource manager to preempt the second service.

6. The computer system of claim 4, wherein the node manager is a task run under the slave of the second resource manager.

7. The computer system of claim 6, wherein the available resources are resources available to the node manager.

8. The computer system of claim 6, wherein the available resources are a subset of resources of the second node.

9. The computer system of claim 1, the operations further comprising:

detecting an end to the traffic spike;

issuing a restore flow to terminate the additional instances of the second service on the first node and the second node.

10. A method for managing a server cluster, the method comprising:

detecting, by a control plane module, a traffic spike determining, by the control plane module, that there are insufficient resources available on a first node associated with a first resource manager and a second node associated with a second resource manager to increase the number of instances of a service; and vertically scaling down the first resource manager such that the first resource manager restarts with fewer resources allocated to it and creates extra capacity for the second resource manager to schedule additional instances of the service on the first node and the second node.

11. The method of claim 10, further comprising:

detecting, by the control plane module, an attempt to schedule a job on the first node by the first resource manager;

determining, by the control plane module, that there are insufficient resources available on the first node for the job;

instructing, by the control plane module, the second resource manager to preempt a second service running on the second node allocated node resources on the second node, wherein the second resource manager deallocates the node resources on the second node for the second service that is allocated the node resources of the second node;

wherein the first resource manager schedules the job on the second node.

12. The method of claim 11, wherein the second service is run by a slave of the second resource manager.

13. The method of claim 11, wherein the second resource manager instructs a slave of the second resource manager on the second node to allow a node manager of the first resource manager to broadcast available node resources to the first resource manager.

14. The method of claim 11, further comprising:

determining, by the control plane module, that the second service allocated node resources on the second node, is a lower priority than the second job and, based on the determination that the second service is a lower priority than the second job, instructing the second resource manager to preempt the second service.

15. The method of claim 13, wherein the node manager is a task run under the slave of the second resource manager.

16. The method of claim 15, wherein the available resources are resources available to the node manager.

17. The method of claim 15 wherein the available resources are a subset of resources of the second node.

18. The method of claim 10, the operations further comprising:

detecting an end to the traffic spike;

issuing a restore flow to terminate the additional instances of the second service on the first node and the second node.

19. A machine-readable medium comprising instructions for operation of a computing system, which when executed by at least one processor, cause the computing system to perform operations comprising:

detecting, by a control plane module, a traffic spike determining, by the control plane module, that there are insufficient resources available on a first node associated with a first resource manager and a second node associated with a second resource manager to increase the number of instances of a service; and vertically scaling down the first resource manager such that the first resource manager restarts with fewer resources allocated to it and creates extra capacity for the second resource manager to schedule additional instances of the service on the first node and the second node.

20. The machine-readable medium of claim 19, the operations further comprising:

detecting, by the control plane module, an attempt to schedule a job on the first node by the first resource manager;

determining, by the control plane module, that there are insufficient resources available on the first node for the job;

instructing, by the control plane module, the second resource manager to preempt a second service running on the second node allocated node resources on the second node, wherein the second resource manager deallocates the node resources on the second node for the second service that is allocated the node resources of the second node;

wherein the first resource manager schedules the job on the second node.

\* \* \* \* \*

UNITED STATES PATENT AND TRADEMARK OFFICE
CERTIFICATE OF CORRECTION

| | | |
|---|---|---|
| PATENT NO. | : 10,003,500 B2 | Page 1 of 1 |
| APPLICATION NO. | : 15/474039 | |
| DATED | : June 19, 2018 | |
| INVENTOR(S) | : Mohit Soni et al. | |

It is certified that error appears in the above-identified patent and that said Letters Patent is hereby corrected as shown below:

On the Title Page

Under "(*) Notice:", in Column 1, Line 3, after "0 days." delete "days.".

In Column 1, below item (63), insert -- Foreign Application Priority Data
Sep. 10, 2014 (IN) ------------------------ 2591/DEL/2014 --, as a new field entry.

In the Claims

In Column 16, Line 39, in Claim 17, after "claim 15" insert -- , --.

Signed and Sealed this
Twenty-third Day of October, 2018

Andrei Iancu
*Director of the United States Patent and Trademark Office*